(12) United States Patent
Neil et al.

(10) Patent No.: US 8,295,810 B2
(45) Date of Patent: Oct. 23, 2012

(54) NETWORK ELEMENT AND METHOD FOR PROVIDING ACCESS CONTROL FOR A CELLULAR COMMUNICATION NETWORK

(75) Inventors: David Neil, Cambridge (GB); Trevor Moore, Geel (BE); Neil Philip Piercy, Royston (GB)

(73) Assignee: IP. Access Limited, Cambridgeshire (GB)

( * ) Notice: Subject to any disclaimer, the term of this patent is extended or adjusted under 35 U.S.C. 154(b) by 418 days.

(21) Appl. No.: 12/442,985

(22) PCT Filed: Sep. 28, 2007

(86) PCT No.: PCT/EP2007/060338
§ 371 (c)(1),
(2), (4) Date: Oct. 26, 2009

(87) PCT Pub. No.: WO2008/037804
PCT Pub. Date: Apr. 3, 2008

(65) Prior Publication Data
US 2010/0144316 A1    Jun. 10, 2010

(30) Foreign Application Priority Data
Sep. 29, 2006    (GB) .................................. 0619179.5

(51) Int. Cl.
*H04M 1/66* (2006.01)
*H04W 36/00* (2009.01)
*H04W 4/00* (2009.01)

(52) U.S. Cl. .................... 455/411; 455/436; 370/338

(58) Field of Classification Search ................. 455/410, 455/411, 436; 370/328, 338
See application file for complete search history.

(56) References Cited

U.S. PATENT DOCUMENTS

| | | | |
|---|---|---|---|
| 6,049,877 A * | 4/2000 | White | 726/5 |
| 6,434,137 B1 * | 8/2002 | Anderson et al. | 370/347 |
| 7,072,354 B1 * | 7/2006 | Beathard | 370/447 |
| 7,155,526 B2 * | 12/2006 | Chaudhary et al. | 709/229 |
| 7,194,761 B1 * | 3/2007 | Champagne | 726/6 |
| 7,318,234 B1 * | 1/2008 | Dharmarajan | 726/2 |
| 2006/0159031 A1 * | 7/2006 | Vialen et al. | 370/252 |
| 2006/0282880 A1 * | 12/2006 | Haverinen et al. | 726/3 |
| 2007/0191001 A1 * | 8/2007 | Tariq et al. | 455/426.1 |
| 2007/0234054 A1 * | 10/2007 | Robert et al. | 713/170 |

FOREIGN PATENT DOCUMENTS

| | | |
|---|---|---|
| EP | 1519613 | 3/2005 |
| WO | 9920067 | 4/1999 |
| WO | 2005065214 | 7/2005 |

* cited by examiner

*Primary Examiner* — Christopher M Brandt
(74) *Attorney, Agent, or Firm* — Price Heneveld LLP

(57) ABSTRACT

A network element (130, 330), for providing access control to a core network (120) of a cellular communication network (100) for a wireless communication unit (150) operating within a communication cell supported by the network element (130, 330), comprises a receiver for receiving a message (425) from the wireless communication unit (150) comprising identity information. The network element further comprises logic (160), operably coupled to the receiver, for determining whether to permit the mobile communication unit (150) access to the core network (120), based at least in part on the received identity information.

17 Claims, 3 Drawing Sheets

NETWORK ELEMENT AND METHOD FOR PROVIDING ACCESS CONTROL FOR A CELLULAR COMMUNICATION NETWORK

FIELD OF THE INVENTION

The invention relates to a network element and method for providing access control for a cellular communication network, and more particularly to a network element and method for providing access control for in-building wireless (mobile) communication units attempting to connect to a core network of a cellular communication network.

BACKGROUND OF THE INVENTION

Wireless communication systems are well known in the art, such as the $3^{rd}$ Generation (3G) of mobile telephone standards and technology. An example of such 3G standards and technology is the Universal Mobile Telecommunications System (UMTS), developed by the $3^{rd}$ Generation Partnership Project (3GPP) (www.3gpp.org).

Typically, wireless communication units, or User Equipment (UE) as they are often referred to, communicate with a Core Network (CN) of a wireless communication system via a Radio Network Subsystem (RNS). A wireless communication network typically comprises a plurality of radio network subsystems, each radio network subsystem comprising one or more cells to which UEs may attach, and thereby connect to the network.

Access to a network, or services provided by the network, is typically authorised by the CN of the network. Furthermore, such access to the network is typically provided irrespective of the particular cell to which a UE is attached, so long as they are within communication range of a serving base station. However, the inventor has recognised that in certain circumstances it may be desirable for access to the network via specific cells to be limited, for example to specific UEs or users, or indeed access to be prevented for specific UEs or users.

By way of example, femto-cell or pico-cell Access Points (APs) are a recent development within the field of wireless cellular communication systems. Femto-cells or pico-cells are effectively communication coverage areas supported by low power base stations (otherwise referred to as serving communication units). These cells are able to be piggy-backed onto the more widely used macro-cellular network and support communications to UEs in a restricted, for example 'in-building', environment. Typical applications for such femto-cell or pico-cell APs include, by way of example, residential and commercial (e.g. office) locations, 'hotspots', etc, whereby an AP can be connected to a core network via, for example, the Internet using a broadband connection or the like. In this manner, femto-cells or pico-cells can be provided in a simple, scalable deployment in specific in-building locations where, for example, network congestion at the macro-cell level is an issue.

As will be appreciated, where the provider of the AP is a homeowner, business, etc., for example in a case of residential or commercial applications, public access to the network via the AP would be undesirable. Accordingly, it would be desirable for access to the network via such APs to be limited, for example to specific UEs or users, or access to be prevented for specific UEs or users.

As previously mentioned, access to a network, or services provided by the network, is typically authorised by the CN. When a UE moves from one location area to another location area, the UE sends a location update request to the core network, the location update request typically comprises a mobile subscriber identity number for the UE and a location area code (LAC) for the location area for which the UE has moved into. In order for the CN to limit access for individual cells, it would be necessary for each cell to be provided with a unique LAC. As will be appreciated by a skilled artisan, the LAC typically only comprises 16 bits, and as such only 65,535 unique LACs are possible. Since wireless communication networks typically comprise individual cells which number in the millions, using the LAC to limit access for individual cells is clearly not a practical solution.

3GPP technical specification 22.043 defines Support of Localized Service Area (SoLSA), which specifies a mechanism that can be used as a platform for providing special tariffs, and/or a special set of service features for certain subscriber units within a regionally restricted area or areas. In particular, SoLSA allows a network operator to offer subscribers, or groups of subscribers, different services, different tariffs and different access rights depending on their geographical location.

A problem with SoLSA is that it requires the CN, the radio network sub-system (RNS) and the UE to be upgraded in order to support this functionality. This is a particular problem with regard to UEs, since it takes significant effort and a long time for new functionality to be provided within UEs, and to achieve a level of market penetration where it becomes possible to rely on the use of the new functionality. As a consequence, there has been limited, if any, support for SoLSA. Thus, SoLSA has failed to provide a suitable mechanism with which to limit access to the network for individual cells.

Thus, there exists a need for a method and apparatus for providing access control for a cellular communication network, which aims to address at least some of the shortcomings of past and present access control techniques and/or mechanisms.

SUMMARY OF THE INVENTION

Accordingly, the invention seeks to mitigate, alleviate or eliminate one or more of the abovementioned disadvantages singly or in any combination.

According to a first aspect of the invention, there is provided a network element for providing access control, for a wireless communication unit operating within a communication cell supported by the network element, to a core network of a cellular communication network. The network element comprises a receiver for receiving a message from the wireless communication unit comprising identity information. The network element further comprises logic, operably coupled to the receiver, for determining whether to permit the mobile communication unit access to the core network, based at least in part on the received identity information.

In one optional embodiment of the invention, the network element comprises a transmitter for transmitting an Identity Request message to the wireless communication unit, such that the message received from the mobile communication unit comprising identity information is received in response thereto.

In one optional embodiment of the invention, the receiver receives a Location Update Request message from the wireless communication unit attempting to connect to the core network and the network element transmits an Identity Request message to the wireless communication unit in response thereto.

In one optional embodiment of the invention, the Location Update Request message may be intended for the core network, and the logic in the network element may be arranged to intercept the Location Update Request message. In one optional embodiment of the invention, the Location Update Request message may be in a form of a Mobility Management (MM) message, intended for receipt by the core network.

In this manner, when a mobile communication unit attaches to a cell, and performs, say a location update procedure, the identity of the mobile communication unit attempting to connect to the core network via the cell may be determined. For example, an identity for the wireless communication unit may be requested, in order to determine whether the wireless communication unit should be allowed to access the core network via that communication cell. Consequently, access to the network may be limited on an individual cell basis. Furthermore, by utilising the location update procedure, it may not be necessary for wireless communication units or the core network to be upgraded in order to support this enhanced functionality.

In one optional embodiment of the invention, the network element may comprise a memory element, operably coupled to the logic, and arranged to store the message such that the logic may retrieve the message from the memory element and forward the message to the core network, if the logic determines that the wireless communication unit is permitted access to the core network. In this manner, the network element may be able to store and process the message whilst determining whether the message emanates from a valid wireless communication unit, and forwards the message on to the core network if it does.

In one optional embodiment of the invention, the logic may be arranged to send a null message to the core network in addition to forwarding the message to the core network. In this manner, the sending of a null message to the core network may ensure that counters between the wireless communication unit and the core network remain synchronised.

In one optional embodiment of the invention, the logic may be arranged to construct the null message with a same sequence number as that of the message received from the wireless communication unit comprising identity information.

In one optional embodiment of the invention, the logic may construct and send, and optionally continue to re-send, a User Authentication Request message comprising an invalid Authentication Token, in response to the logic determining that the wireless communication unit is not permitted access to the core network. In this manner, by using a failed authentication procedure to reject the wireless communication unit, the network element may force the wireless communication unit to treat the individual cell as 'cell barred'.

In one optional embodiment of the invention, the communication cell supported by the network element may be allocated a locally unique location area code. In this manner, by modifying the known allocation of location area codes, the network may ensure that no adjacent cells have the same code. This may force the wireless communication unit to perform a location update whenever it enters a new cell.

In one optional embodiment of the invention, the network element may comprise a memory element arranged to store IMSIs for wireless communication units permitted access to the core network via the communication cell. In this manner, the network element may be able to provide access control based on information contained therein, without needing to consult or pass on messages to the core network.

In one optional embodiment of the invention, the network element may be an access point base station, for example, one part of a radio network sub-system comprising an access point base station controller, via which the access to the core network is supported. For example, the network element may be a Node-B arranged to support access over a Universal Mobile Telecommunications System (UMTS) network. In this manner, the network element is suitable to support femto-cell or pico-cell communications.

According to a second aspect of the invention, there is provided a method for providing access control to a core network of a cellular communication network, for a wireless communication unit operating within a communication cell and supported by the network element. The method comprises receiving a message from the wireless communication unit comprising identity information and determining whether to permit the wireless communication unit access to the core network based at least in part on the received identity information.

According to a third aspect of the invention, there is provided a radio network sub-system comprising an aforementioned network element.

According to a fourth aspect of the invention, there is provided a wireless communication system comprising an aforementioned network element or adapted to support the aforementioned method of access control.

According to a fifth aspect of the invention there is provided a computer-readable storage element having computer-readable code stored thereon for programming signal processing logic to perform a method for providing access control to a core network of a cellular communication network for a wireless communication unit operating within a communication cell supported by the network element. The method comprises receiving a message from the wireless communication unit comprising identity information and determining whether to permit the wireless communication unit access to the core network, based at least in part on the received identity information.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
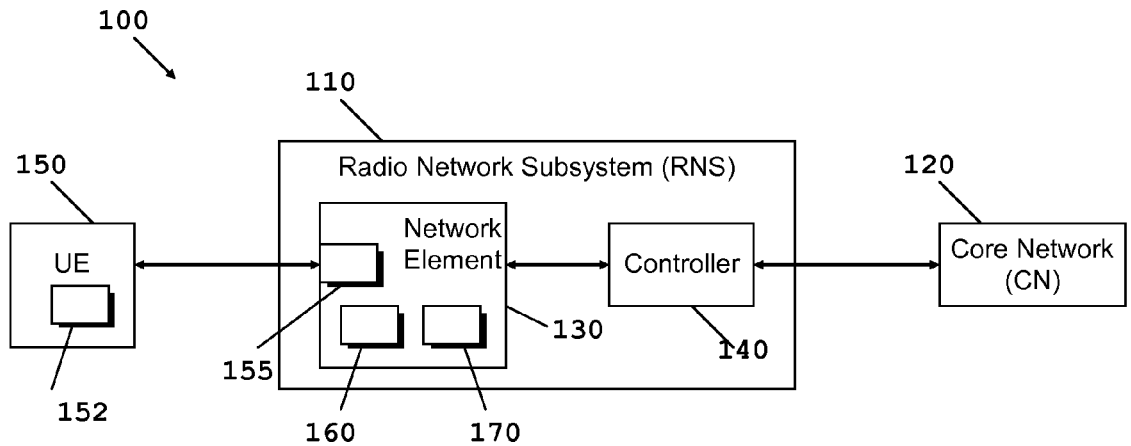
FIG. 1 illustrates an example of part of a Universal Mobile Telecommunications System (UMTS) network in accordance with some embodiments of the invention.

Referring now to the drawings, and in particular FIG. 1, an example of part of a Universal Mobile Telecommunications System (UMTS) network adapted in accordance with some embodiments of the invention is shown and indicated generally at 100. Those skilled in the art, however, will recognize and appreciate that the specifics of this example are merely illustrative of some embodiments and that the teachings set forth herein are applicable in a variety of alternative settings. For example, since the teachings described hereafter do not depend on a particular cellular communication network conforming to any specific standard, it is envisaged that the teachings and inventive concept described therein can be applied to any type of cellular communication network, although a UMTS network is shown in this embodiment. As such, other alternative implementations within cellular communication networks conforming to different standards are contemplated and are within the scope of the various teachings described.

The UMTS network 100 comprises a radio network subsystem (RNS) 110 operably coupled to a core network (CN) 120 of the UMTS network 100. The RNS 110 comprises a network element 130 arranged to support communication in at least one communication cell within the UMTS network, via which at least one mobile communication unit, or User Equipment (UE) 150, may connect to the CN 120. The network element 130 is further arranged to provide access control for UEs 150 attempting to connect to the core network 120 from the at least one communication cell. The RNS 110 further comprises a controller 140, via which the network element 130 is coupled to the CN 120. The network element 130 comprises signal processing logic 160 and memory element 170.

In the context of embodiments of the invention, the UE 150 is a wireless communication unit comprising a transceiver 152 arranged to transmit and receive signals to/from the radio network, in this case network element 130. As would be appreciated by a skilled person, UE 150 comprises numerous other functional and logical elements, operably coupled to the transceiver 152, to support wireless communications and functionality and which will not be described further herein. In addition, network element 130 also comprises at least one transceiver 155, comprising receiver circuitry and transceiver circuitry, arranged to transmit and receive signals to/from the UE 150. As would be appreciated by a skilled person, network element 130 comprises numerous other functional and logical elements and functionality, in addition to those illustrated, in order to support wireless communications with the UE and wired or wireless communication with the core network 120, and which will not be described further herein.

Figure 2:
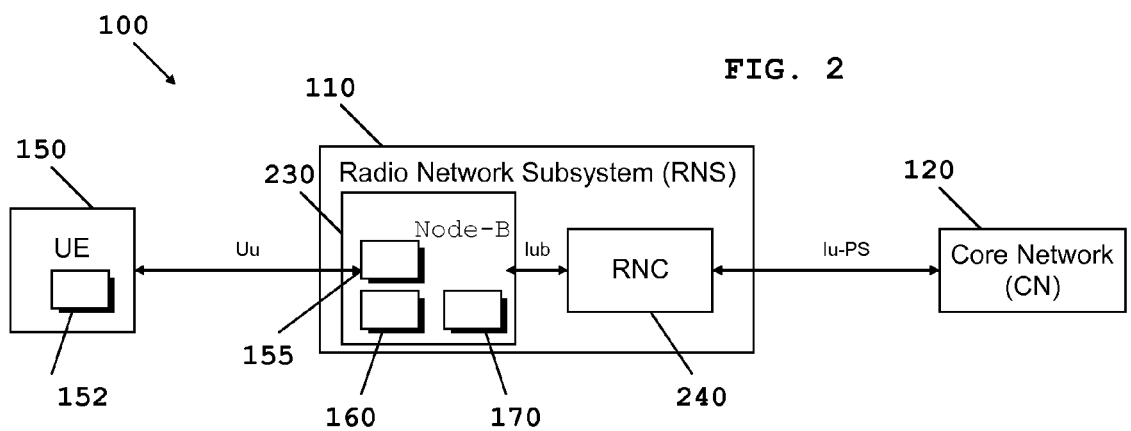
FIG. 2 illustrates an example of a radio network sub-system of FIG. 1 in accordance with an embodiment of the invention.

Referring now to FIG. 2, there is illustrated an example of the RNS 110 of FIG. 1 in accordance with an embodiment of the invention. For the embodiment illustrated in FIG. 2, the RNS 110 comprises a network element in a form of a Node-B 230, and a controller in a form of a Radio Network Controller (RNC) 240.

As will be appreciated by a skilled artisan, 'Node-B' is a term used within UMTS to denote a base transceiver station (BTS). As is typical in cellular communication systems, a base station, such as a Node-B 230, comprises at least one radio frequency (RF) receiver (not shown) and at least one RF transmitter (not shown), used to communicate wirelessly with UEs, such as UE 150, over an air interface (Uu).

As will also be appreciated by a skilled artisan, a radio network controller (RNC) 240 within a UMTS radio access network (UTRAN), which for the illustrated embodiment comprises the RNS 110, is responsible for control of each Node-B connected thereto via an Iub interface. Typically, the RNC carries out radio resource management, some of the mobility management functions, etc. The RNC 240 is coupled to the CN 120 via, in a case of a packet switched core network, an Iu-PS interface.

Figure 3:
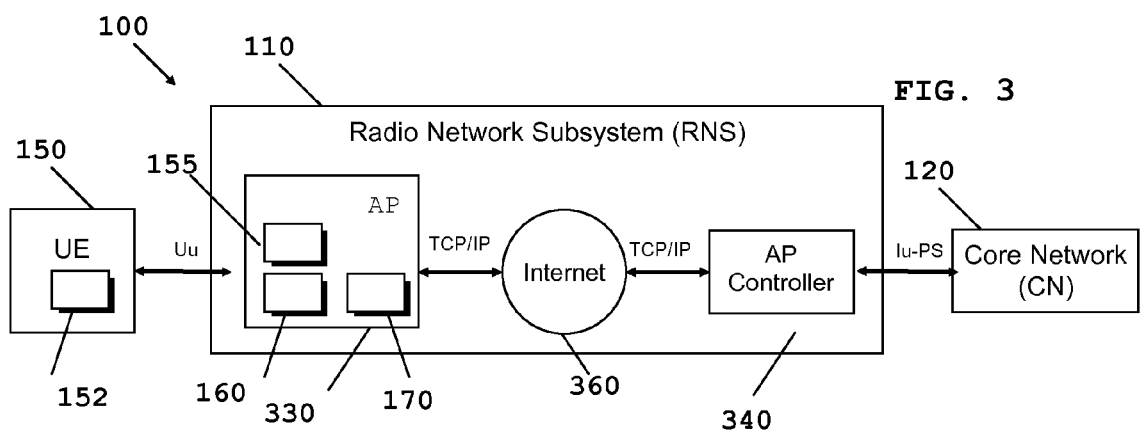
FIG. 3 illustrates an example of a radio network sub-system of FIG. 1 in accordance with an alternative embodiment of the invention.

Referring now to FIG. 3, there is illustrated an example of the RNS 110 of FIG. 1 in accordance with an alternative embodiment of the present invention. For the embodiment illustrated in FIG. 3, the RNS 110 comprises a network element in a form of an Access Point (AP) 330, and a controller in the form of an AP controller 340.

As will be appreciated by a skilled artisan, an Access Point (AP) is a communication element that facilities access to a communication network via a communication cell, such as a femto-cell. One application is that a femto-AP may be purchased by a member of the public and installed in their home. The femto-AP may then be connected to a femto-AP controller over the owner's broadband connection. As the femto-AP is using resources paid for by the owner, it is desirable for the owner to control who has access to the femto-AP.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a UMTS system may comprise Node-B functionality and some aspects of RNC functionality. For the embodiment illustrated in FIG. 3, the AP 330 is coupled to the AP controller 340 via the Internet 360, the AP 330 and AP controller 340 forming a part of the RNS 110.

In the same manner as for a Node-B, such as the Node-B 230 of FIG. 2, the AP communicates with UEs, such as UE 150, via a wireless interface (Uu).

The AP controller 340 may be coupled to the CN 120 via Iu-PS interface. In this manner, the AP 330 is able to provide voice and data services to a cellular handset, such as UE 150, in the same way as a conventional Node-B, but with the deployment simplicity of, for example, a Wireless Local Area Network (WLAN) access point.

Figure 4:
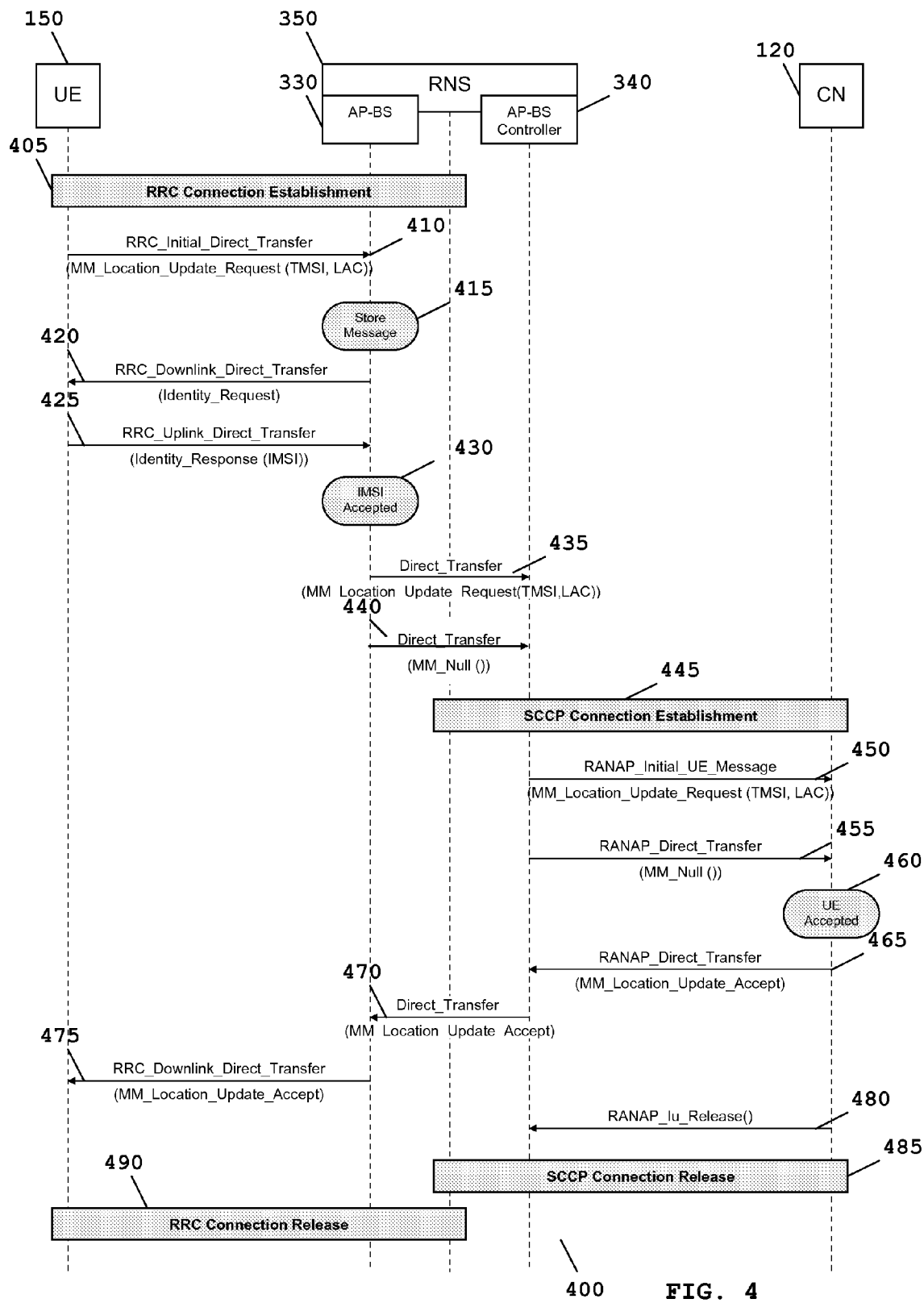
FIG. 4 illustrates a message sequence chart of an exemplary method of providing access control for an authorised mobile communication unit in accordance with an embodiment of the invention.

Referring now to FIG. 4 there is illustrated a message sequence chart 400 of an example of a method, such as may be implemented by the AP 330 of FIG. 3, of providing access control for an authorised UE in accordance with an embodiment of the invention.

The method starts with an establishment of a Radio Resource Control (RRC) connection 405 when the UE 150 attempts to join a cell provided by the AP 330. Having established an RRC connection 405, the UE 150 sends a Location Update Request message 410 to the CN 120, via the RNS 110.

As will be appreciated by a skilled artisan, a UE 150 will send a Location Update Request message when it enters a communication cell having a Location Area Code (LAC) different to that of the communication cell from which the UE 150 has come, or when the UE 150 first attempts to connect to the network. In order to ensure that a UE 150 sends a Location Update Request, the communication cell supported by the AP 330 preferably comprises a locally unique LAC, such that the LAC differs from those of neighbouring/adjacent communication cells from which a UE 150 may move. Thus, the LAC may relate to one or more further communication cells, if those communication cells are not adjacent to the communication cell supported by the AP 330.

The Location Update Request message 410 is in a form of a Mobility Management (MM) message, and initiates a location update procedure, allowing a UE 150 to inform the CN 120 whenever it moves from one location area to another. Typically, MM messages are communicated between a UE 150 and the CN 120, the RNS 110 being substantially transparent and simply relaying the MM messages between the UE 150 and the CN 120.

In one embodiment of the invention, the Location Update Request message comprises a Temporary Mobile Subscriber Identity (TMSI) number that has preferably previously been assigned to the UE 150 by the CN 120 and the LAC of the communication cell to which the UE 150 has moved (e.g. the LAC of the AP 330 for the illustrated embodiment). In this manner, the CN 120 is able to identify the UE 150, and determine to which location area the UE 150 has moved. As will be appreciated by a skilled artisan, only the CN 120 is able to identify a UE 150 from the TMSI of that UE 120.

For the embodiment illustrated in FIG. 4, upon receipt of the Location Update Request message 410 from the UE 150 over the air interface (Uu), the RNS 110, or more particularly the AP 330 for the illustrated embodiment, intercepts and stores the message 415, and sends an Identity Request message 420 to the UE 150. The UE 150 then responds with an Identity Response message 425 comprising an identification of the UE 150, which for the illustrated embodiment comprises an International Mobile Subscriber Identity (IMSI) number of the UE 150.

The AP 330 then determines whether the UE 150 should be permitted access to the network using the IMSI, and for the example illustrated in FIG. 4 accepts 430 the IMSI. Having accepted the IMSI, and thus determined that the UE 150 should be permitted access to the network, the AP 330 retrieves the stored Location Update Request message, and forwards it to the CN 120, in message 435 via the AP controller 340.

Typically, Identity Request messages to a UE 150 originate from the CN 120, for example in a form of a MM message. Consequently, in accordance with one embodiment of the invention, the AP 330 may send the Identity Request message 420 as a MM message, which appears to originate from the CN 120. Where this is the case, the Identity Response message 425 from the UE 150 will also be in a form of a MM message, intended for the CN 120.

As will be appreciated by a skilled artisan, uplink messages from the UE 150 to the CN 120 contain a sequence number. The CN 120 checks the sequence number in all received messages it receives from a UE 150 and discards the message if the sequence number is incorrect. When the AP 330 exchanges Identity Request/Response messages with the UE 150, the counter in the UE 150 will have been incremented, as the UE 150 believed it was communicating with the CN 120.

In order to maintain synchronisation between the UE 150 and the CN 120, the AP 330 sends a null message 440 to the CN 120, via the AP controller 340, in addition to forwarding the Location Update Request message. The null message 440 is constructed with the same sequence number as that of the Identity Response message 425 received from the UE 150.

The AP controller 340 receives the Location Update Request message 435, and the null message 440, and establishes a Signalling Connection Control Part (SCCP) connection 445 with the CN 120, and transmits the Location Update Request message 450 and the null message 455 to the CN 120 via, for example, the Iu-PS connection. Upon receipt of each message, the CN 120 increments its counter in order to remain synchronised with the UE 150. Thus, the null message 455 causes the CN 120 to increment its counter a second time, thereby avoiding a loss of synchronisation that would otherwise be caused by the Identity Response message 425.

Having received the Location Update Request, the CN 120 identifies the UE 150 based on its TMSI, and then decides whether to allow the UE 150 into the new location area. For the example illustrated in FIG. 4, the CN 120 accepts 460 the UE 150, and transmits a Location Update Accept message 465 back to the RNS 110.

The AP controller 340 receives the Location Update Accept message 465, and forwards the message 470 to the AP 330, which then transmits the message 475 over the air interface to the UE 150.

Having transmitted the Location Update Accept message 465 back to the RNS 110, the CN 120 sends a Connection Release message 480 to the RNS 110. The RNS 110, upon receipt of the Connection Release message 480, releases the SCCP connection 485 there between. Similarly, once the AP 350 has transmitted the Location Update Accept message 475 to the UE 150, it releases the RRC connection 490 there between.

Figure 5:
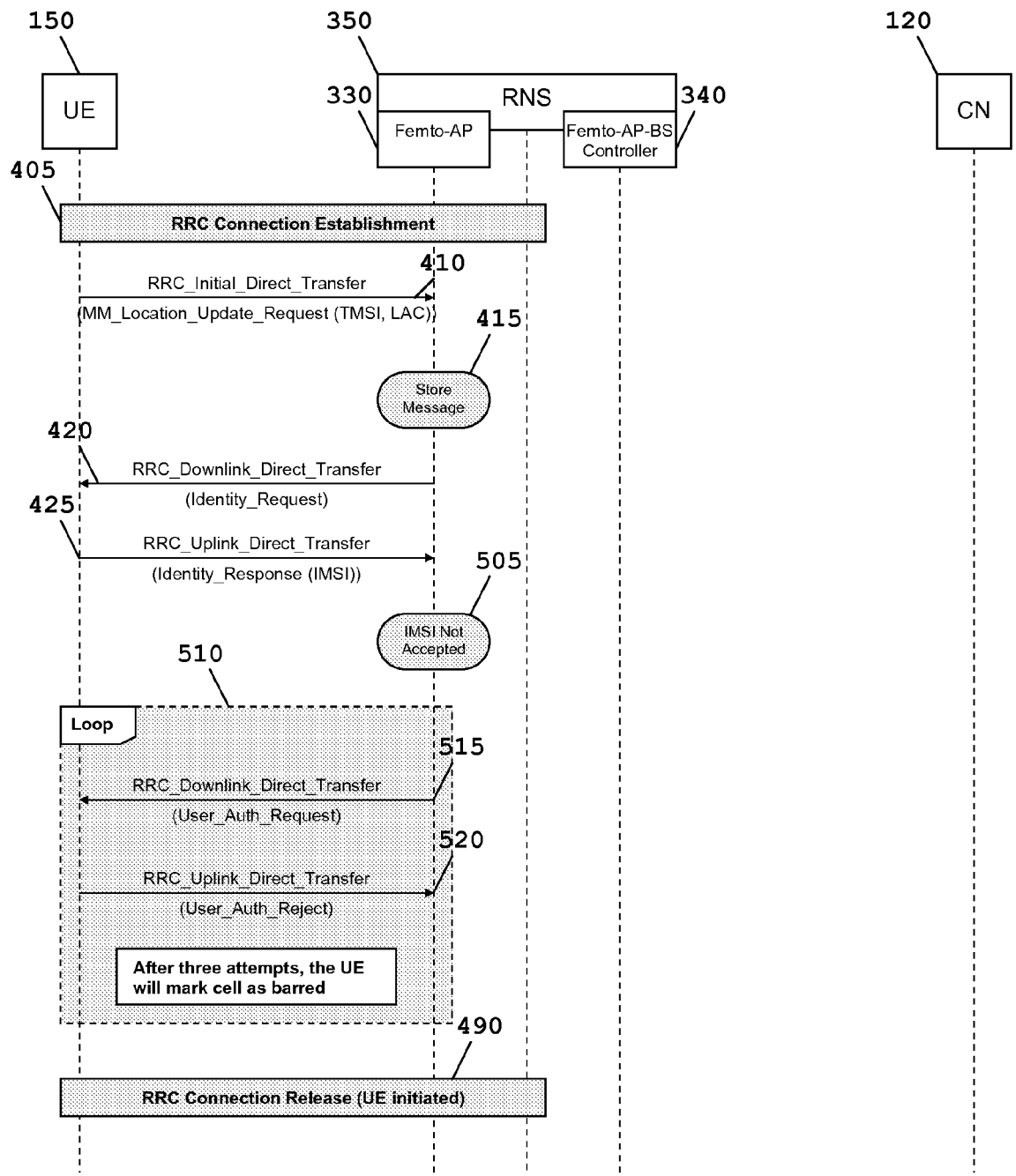
FIG. 5 illustrates message sequence chart of an exemplary method of providing access control for an unauthorised mobile communication unit in accordance with an embodiment of the invention.

Referring now to FIG. 5, there is illustrated a message sequence chart 500 of an example of a method, such as may be implemented by the RNS 110 of FIG. 3, of providing access control for an 'unauthorised' UE 150 in accordance with an embodiment of the invention.

In the same way as for the method of FIG. 4, the method starts with the establishment of an RRC connection 405 when the UE 150 attempts to join a communication cell supported by the AP 330. Having established an RRC connection 405, the UE 150 sends a Location Update Request message 410 to the CN 120, via the RNS 110.

Upon receipt of the Location Update Request message 410 from the UE 150 over the air-interface, the RNS 110, or more particularly the AP 330 for the illustrated embodiment, intercepts and stores 415 the message, and sends an Identity Request message 420 to the UE 150. The UE 150 then responds with an Identity Response message 425 comprising the identification of the UE 150, which for the illustrated embodiment comprises the IMSI of the UE 150.

The AP 330 then determines whether the UE 150 should be permitted access to the network using the IMSI, and for the example illustrated in FIG. 5, does not accept 505 the IMSI. The AP 330 then effectively rejects communication from the UE 150 in that particular communication cell, by issuing a rejection to the user requests.

For the embodiment illustrated in FIG. 5, the AP 330 constructs a User Authentication Request message 515 comprising an invalid Authentication Token, and sends this message to the UE 150. Upon receipt of the User Authentication Request message 515, the UE 150 fails to authenticate the AP 330 due to the invalid Authentication Token, and responds with a User Authentication Reject message 520. Upon receipt of the User Authentication Reject message 520 from the UE 150, the AP 330 re-sends the User Authentication Request message 515 comprising the invalid Authentication Token. The AP continues sending the User Authentication Request message 515 comprising the invalid Authentication Token upon receipt of a User Authentication Reject message 520 in a loop 510 until, having received three consecutive 'invalid' User Authentication Request messages 515, the UE 150 no longer trusts the AP 330. Thereafter, for example, the UE 150 marks the AP 330 as 'barred', and releases the RRC connection 490. Once the UE 150 has marked the communication cell as barred, the UE 150 will no longer attempt to use the cell to connect to the network.

Alternative techniques are contemplated for rejecting a UE. For example, a network element, upon determining not to permit the UE access to the core network, may release the RRC connection. However, this may result in the UE attempting to establish a new connection with the network element. A further alternative may be for the network element to send a 'Location Update Reject' message to the UE. However, this would cause the UE to stop accessing any cell having the Location Area Code as that of the cell provided by the network element.

The determination by the AP 330 whether the UE 150 should be permitted access to the network provides the advantage of enabling access to a network to be limited on an individual cell basis. Furthermore, by utilising the location update procedure within, for example, a UMTS system, in order to enable the AP 330 to identify when a UE 150 joins the cell, and to request the identity (IMSI) of the UE 150, the mechanism substantially alleviates any need for the UE to be adapted to support the functionality. The same is true for the use of an invalid Authentication Token within a User Authentication Request message, as the use of such a parameter in the manner described effectively causes the UE to leave the cell.

Thus, it is envisaged that the inventive concept may be implemented for current UEs, and thus substantially alleviates a problem of providing new functionality within UEs, which is known to be time consuming and only commercially viable once a high level of market penetration has been achieved. Furthermore, the determination by the AP 330 as to whether the UE 150 should be permitted access to the network is advantageously substantially hidden from the CN 120, and as such requires no supporting functionality to be provided within the CN 120.

As previously mentioned, a network element, such as the AP 330 described above is arranged to provide access control for UEs attempting to connect to a core network (CN) of a cellular communication network. The network element may determine whether to accept a UE or not based on the IMSI for the UE. By way of example, IMSIs for each UE that is permitted to access the CN via the cell of that network element may be stored in a memory element 170 of the network element. In this manner, when a UE attempts to connect to the core network, the network element may compare the IMSI for that UE to those stored in the memory element 170. If the IMSI for that UE matches one of the IMSIs stored in memory, the IMSI is accepted, and the UE is permitted access to the CN. Conversely, if the IMSI does not match one of the IMSIs stored in memory, the IMSI is not accepted, and the network element may apply the procedure described in FIG. 5, which results in the UE leaving the communication cell.

Alternatively, the IMSIs for UEs that are not permitted to access the CN via the particular communication cell of the network element may be stored in memory. In this manner, when a UE attempts to connect to the core network, the network element may compare the IMSI for that UE to those stored in memory. If the IMSI for that UE matches one of the IMSIs stored in memory, the IMSI is not accepted, and the network element cause may again employ the method of FIG. 5 to cause the UE to leave that particular communication cell. Otherwise the IMSI is accepted, and the UE is permitted access to the core network.

It is envisaged that the IMSIs may be stored within a memory unit of the network element (whether those IMSIs are for UEs permitted to access the core network or not permitted access via the cell for that network element), in any suitable manner. For example, the network element may comprise a user interface, or may be operably coupled to a device comprising a user interface such as a personal computer or the like. IMSI may then be stored manually or automatically or provided to the network element in any other manner, say, via the user interface.

Alternatively, telephone numbers associated with IMSIs may be entered into the user interface, and in this way provided to the network element. Upon receipt of one or more telephone numbers, the network element may then request, for example from the core network or other server or host, the IMSI with which the, or each, telephone number is associated.

In this manner, the network element may be configured to provide the required access control, and updated as required.

It will be appreciated that, for clarity purposes, the above description has described embodiments of the invention with reference to different functional units and processors. However, it will be apparent that any suitable distribution of functionality between different functional units or processors, for example with respect to the network element or controller, may be used without detracting from the invention. For example, it is envisaged that functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention describes an AP for UMTS network, it is envisaged that the inventive concept is not restricted to this embodiment.

It is envisaged that the aforementioned inventive concept aims to provide one or more of the following advantages:

(i) The inventive concept enables access control for a network to be provided on an individual cell basis.

(ii) The inventive concept only requires supporting functionality to be provided within an RNS, and in particular within a network element arranged to support communication in at least one communication cell within the cellular communication network, such as a base station, Node-B, access point, etc.

(iii) The inventive concept does not require supporting functionality to be provided within UEs.

(iv) The inventive concept does not require supporting functionality to be provided within the core network.

(v) The modifying of the known allocation of location area codes ensures that no adjacent cells have the same code. This forces the UE to perform a location update whenever it enters a new cell.

(vi) Initiating an Identity Procedure from the Access Network instead of the core network allows the access network to discover the IMSI of a UE when it connects.

(vii) Sending a MM_NULL message to the core network ensures that the counters of the network element and the core network remain synchronised.

(viii) Using the failed authentication procedure to reject the UE makes the UE treat the individual cell as 'cell barred'. A more usual method of rejecting the UE is to send a Location Update Reject message. This has the downside that the UE is blocked from accessing all the cells with the same Location Area Code rather than just the individual cell.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Moreover, an embodiment can be implemented as a computer-readable storage element having computer readable code stored thereon for programming a computer (e.g., comprising a signal processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

Thus, a method and apparatus for providing access control for a cellular communication network has been described, which substantially addresses at least some of the shortcomings of past and present access control techniques and/or mechanisms.

The invention claimed is:

1. A network element for providing access control to a core network of a cellular communication network for a wireless communication unit operating within a communication cell supported by the network element, wherein the network element comprises:
    a receiver for receiving a message from the wireless communication unit comprising identity information;
    logic, operably coupled to the receiver, for determining whether to permit the mobile communication unit access to the core network, based at least in part on the received identity information and whether to forward the message to the core network;
    wherein if the logic determines not to forward the message comprising identity information to the core network, but the wireless communication unit is permitted access to the core network, the logic is arranged to construct and send a null message to the core network with a same sequence number as that of the message received from the wireless communication unit.

2. The network element of claim 1 further comprising:
    a transmitter for transmitting an Identity Request message to the wireless communication unit, wherein the message received from the wireless communication unit comprises identity information received in response thereto.

3. The network element of claim 2 wherein the receiver of the network element receives a Location Update Request message from the wireless communication unit attempting to connect to the core network and the transmitter transmits the Identity Request message to the wireless communication unit in response thereto.

4. The network element of claim 3 wherein the Location Update Request message is intended for the core network, and the logic in the network element is arranged to intercept the Location Update Request message.

5. The network element of claim 4 wherein the Location Update Request message is in a form of a Mobility Management (MM) message, intended for receipt by the core network.

6. The network element of claim 3 wherein the network element further comprises:
    a memory element, operably coupled to the logic, and arranged to store the Location Update Request message such that the logic retrieves the Location Update Request message from the memory element and forwards the message to the core network, if the logic determines that the wireless communication unit is permitted access to the core network.

7. The network element of claim 1 wherein the logic sends a User Authentication Request message to the wireless communication unit.

8. The network element of claim 7 wherein the logic, upon receipt of a User Authentication Reject message from the wireless communication unit, re-sends the User Authentication Request message comprising the invalid Authentication Token to the wireless communication unit.

9. The network element of claim 1 wherein the communication cell supported by the network element is allocated a locally unique location area code.

10. The network element of claim 9 wherein a Location Update Request message is received from the wireless communication unit as a consequence of the wireless communication unit identifying the locally unique location area code.

11. The network element of claim 1 wherein the message comprises an International Mobile Subscriber Identity (IMSI) number of the wireless communication unit.

12. The network element of claim 11 further comprising a memory element arranged to store a plurality of IMSIs for a plurality of wireless communication units permitted access to the core network via the communication cell.

13. The network element of claim 12 further characterised in that the logic is arranged to determine whether to permit the wireless communication unit access to the core network by comparing the IMSI for that wireless communication unit, received within the message to the plurality of IMSIs stored in the memory element.

14. The network element of claim 1 wherein the network element is at least one from a group of:
    an access point base station, a radio network sub-system comprising an access point base station controller, via which the access to the core network is supported; or a Node-B arranged to support communication over a Universal Mobile Telecommunications System (UMTS) network.

15. A method for providing access control to a core network of a cellular communication network for a wireless communication unit operating within a communication cell supported by the network element, the method comprising:
- receiving a message from the wireless communication unit comprising identity information;
- determining whether to permit the wireless communication unit access to the core network, based at least in part on the received identity information and whether to forward the message; and
- if it is determined not to forward the message to the core network, but that the wireless communication unit is permitted access to the core network;
- constructing and sending additionally a null message to the core network with a same sequence number as that of the message received from the wireless communication unit.

16. A non-transitory computer readable medium having computer readable instructions stored thereon for execution by a processor to perform a method for providing access control to a core network of a cellular communication network for a wireless communication unit operating within a communication cell supported by the network element, the method comprising the steps of:
- receiving a message from the wireless communication unit comprising identity information;
- determining whether to permit the wireless communication unit access to the core network, based at least in part on the received identity information and whether to forward the message; and
- if the logic determines not to forward the message to the core network, but tha the wireless communication unit is permitted access to the core network constructing and sending additionally a null message to the core network with a same sequence number as that of the message received from the wireless communication unit.

17. The computer-readable storage element of claim 16, wherein the computer readable storage medium comprises at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory.

* * * * *